March 1, 1955     I. JEPSON     2,703,381
SPEED CONTROL MECHANISM

Filed July 11, 1950     5 Sheets-Sheet 1

INVENTOR
IVAR JEPSON
BY
McCanna & Morsbach
ATTYS.

March 1, 1955

I. JEPSON 2,703,381

SPEED CONTROL MECHANISM

Filed July 11, 1950

INVENTOR.
IVAR JEPSON
BY McCanna & Morsbach
ATTYS.

March 1, 1955   I. JEPSON   2,703,381
SPEED CONTROL MECHANISM
Filed July 11, 1950   5 Sheets-Sheet 3
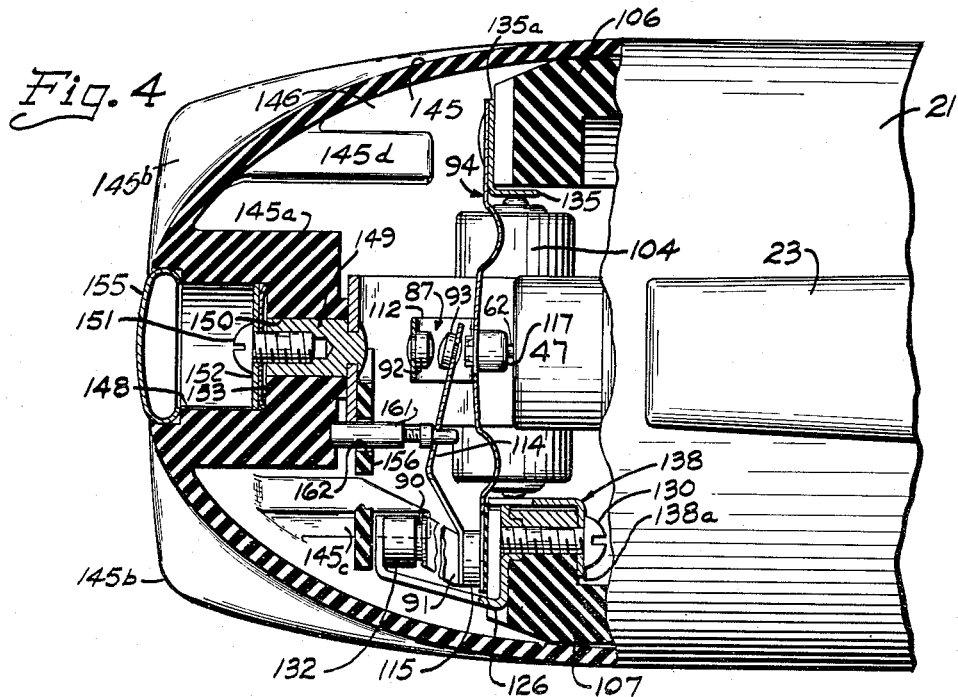
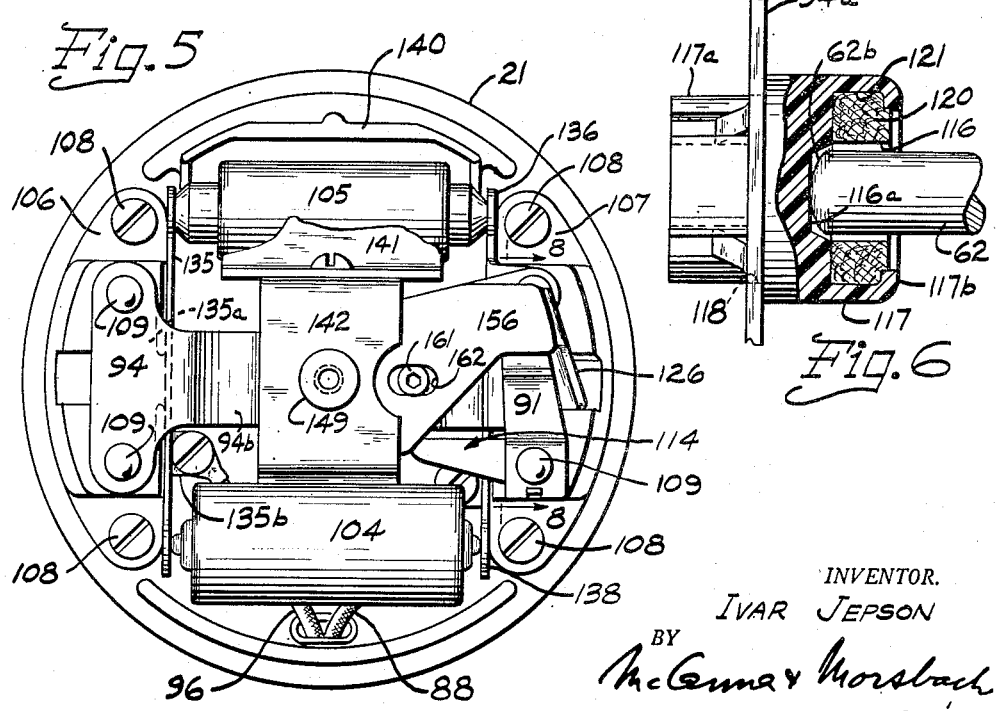
INVENTOR.
IVAR JEPSON
BY McKenna & Morsbach
ATTYS.

March 1, 1955
I. JEPSON
2,703,381
SPEED CONTROL MECHANISM
Filed July 11, 1950
5 Sheets-Sheet 4
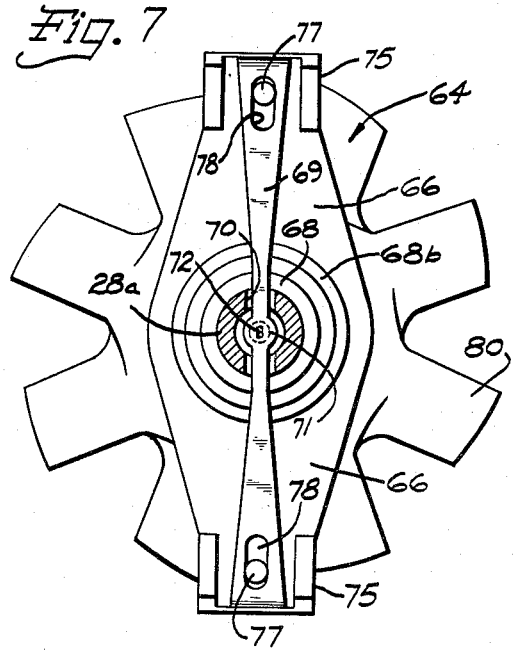
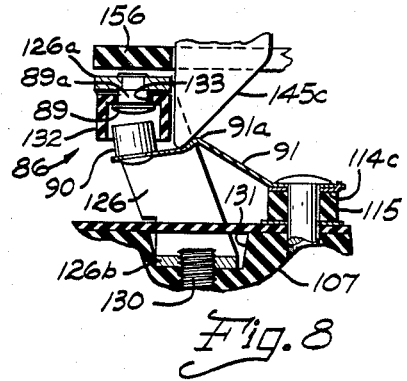
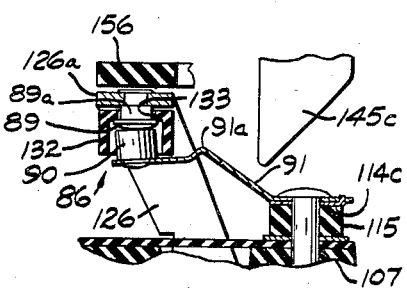
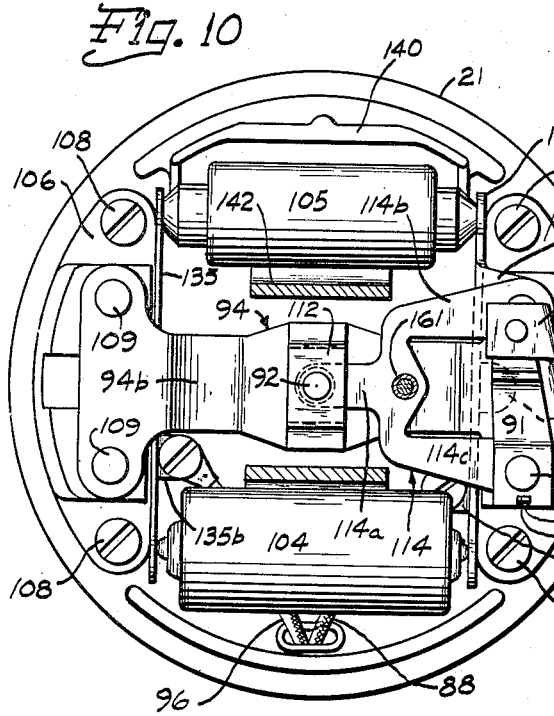
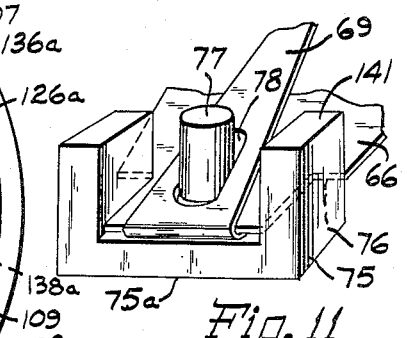
INVENTOR.
IVAR JEPSON
BY McKenna & Morslach
ATTYS.

March 1, 1955     I. JEPSON     2,703,381
SPEED CONTROL MECHANISM
Filed July 11, 1950     5 Sheets-Sheet 5
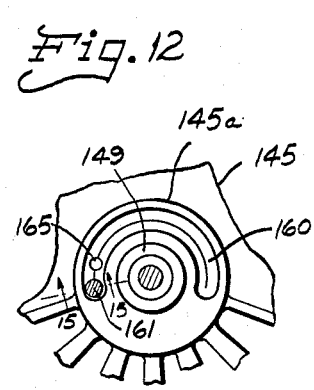
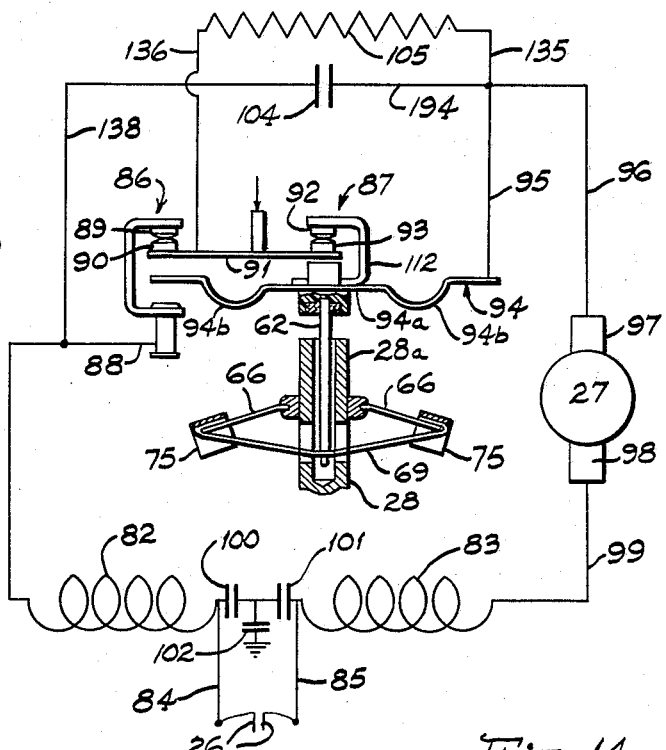
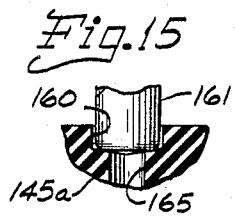
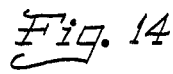
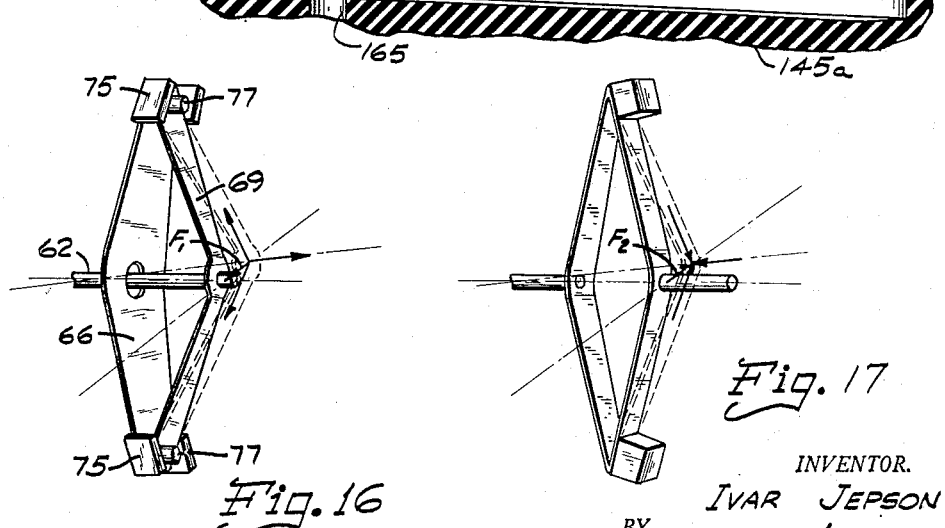
INVENTOR.
IVAR JEPSON
ATTYS.

United States Patent Office 2,703,381
Patented Mar. 1, 1955

2,703,381

SPEED CONTROL MECHANISM

Ivar Jepson, Oak Park, Ill., assignor to Sunbeam Corporation, Chicago, Ill., a corporation of Illinois Application July 11, 1950, Serial No. 173,095

25 Claims. (Cl. 318—325)

This invention relates to motor driven appliances and more particularly to speed control mechanisms for electric food mixers.

Speed control mechanisms for electric food mixers of the type disclosed in United States Letters Patent 2,274,480 have been very succesful and have gone into extensive commercial use. These speed control mechanisms commonly include centrifugally controlled switch means for interrupting the motor circuit when the speed of the motor is above a preselected speed. Conventionally the motors for such food mixers are high speed series wound motors with a worm gear drive for transmitting motion to the beater mechanism. It will be understood that the use of such a worm gear drive introduces the problem of taking care of end thrust on the motor shaft. It is very important that such end thrust is taken up with a minimum amount of friction since otherwise a large amount of available motor power may be lost which results not only in less available motor power, but also in excessive heating and wear of the thrust bearing. It has been found that one satisfactory way to take up this end thrust is to use a small button bearing against the center of the end of the shaft which has a minimum velocity. Any attempt to take this thrust on a collar large enough to pass over the diameter of the shaft has met with failure. This is due to the high thrust coupled with the high velocity.

In one well known prior mixer, the motor shaft was extended out through the rotating governor with the requirement of a fairly strong accurately machined supporting casting disposed outside said governor strong enough to take the end thrust and accurate enough for proper alignment. This casting, at least to some extent, interfered with maximum possible access to the governor parts. It would be desirable to provide an arrangement in which the end thrust could be taken directly by the end bearing brackets and yet provide governor means outside this bearing bracket. This could be accomplished by a small diameter shaft extension beyond the bearing bracket upon which the centrifugal governor would be mounted. Unfortunately, if the shaft extension is made sufficiently strong to carry the rotating governor parts, a large portion of the area at the center of the shaft where the velocity is low and the thrust should be taken by the thrust button is lost and end thrust bearing failure is likely to result. It would be desirable, therefore, to provide an arrangement whereby the end thrust may be provided by the end bearing bracket in an arrangement having a long life and furthermore, the proper governor action is still provided by means disposed outside the end bearing bracket at least as far as parts requiring attention and adjustment is concerned.

Accordingly, it is an object of the present invention to provide a new and improved speed control mechanism for a motor including the desirable features enumerated above.

It is another object of the present invention to provide a novel speed control mechanism for a motor driven appliance that has a minimum of parts, that is efficient, that provides for a substantially frictionless drive between the actuating and actuated parts, that is sturdy, while at the same time being extremely sensitive, and that is relatively inexpensive to manufacture.

It is another object of the present invention to provide a centrifugal governor which is friction free, and much more stable than prior art governors heretofore known.

Still another object of the present invention resides in the provision of a speed control mechanism having a novel switch mechanism.

It is a further object of the present invention to provide a motor driven appliance with novel means for dissipating the heat from a resistor connected in the motor circuit to prevent the formation of "hot spots" on the exterior surface of the casing for the unit.

A still further object of the present invention is to provide a motor driven appliance with a novel control dial for controlling the operation of the motor that is also shaped to form the sole enclosure for the motor control mechanism.

Further objects and advantages of the present invention will become apparent as the following description proceeds and the features of novelty which characterize the invention will be pointed out with particularity in the claims annexed to and forming a part of this specification.

For a better understanding of the present invention, reference may be had to the accompanying drawings in which Fig. 1 is a side elevational view of the motor portion embodying the present invention of a motor driven food mixer, with portions cut away to show the details of construction and particularly to show the governor operated switch contacts in closed position;

Fig. 4 is a fragmentary view similar to Fig. 3 but with the governor control switch in the open position shown in Fig. 2;

Fig. 5 is an end view of the motor unit of Fig. 1 with the control dial removed therefrom;

Fig. 6 is an enlarged sectional view of a small portion of Fig. 1;

Fig. 7 is an enlarged view looking in the direction of the arrows 7—7 of Fig. 2 and assuming the existence of the complete structure in Fig. 2;

Fig. 8 is an enlarged fragmentary sectional view taken substantially along the line 8—8 of Fig. 5 with the main switch shown in the open position;

Fig. 9 is a view similar to Fig. 8 with the main switch shown in a closed position;

Fig. 10 is a sectional view taken substantially along the line 10—10 of Fig. 2 assuming that Fig. 2 shows the complete structure;

Fig. 11 is an enlarged perspective view of a portion of Fig. 7;

Fig. 12 is a sectional view taken substantially along the line 12—12 of Fig. 2 assuming that Fig. 2 shows the complete structure;

Fig. 13 is a schematic circuit diagram of the electrical circuit embodied in the motor and speed control device of the present invention;

Fig. 14 is an enlarged developed view of the cam slot shown in Fig. 12;

Fig. 15 is an enlarged sectional view taken on line 15—15 of Fig. 12;

Fig. 16 is a schematic diagram of the rotating governor parts of the present invention to illustrate the desirable stability characteristics thereof; and Fig. 17 is a schematic diagram similar to Fig. 16 of a prior art governor for comparison purposes with Fig. 16.

Figure 1:
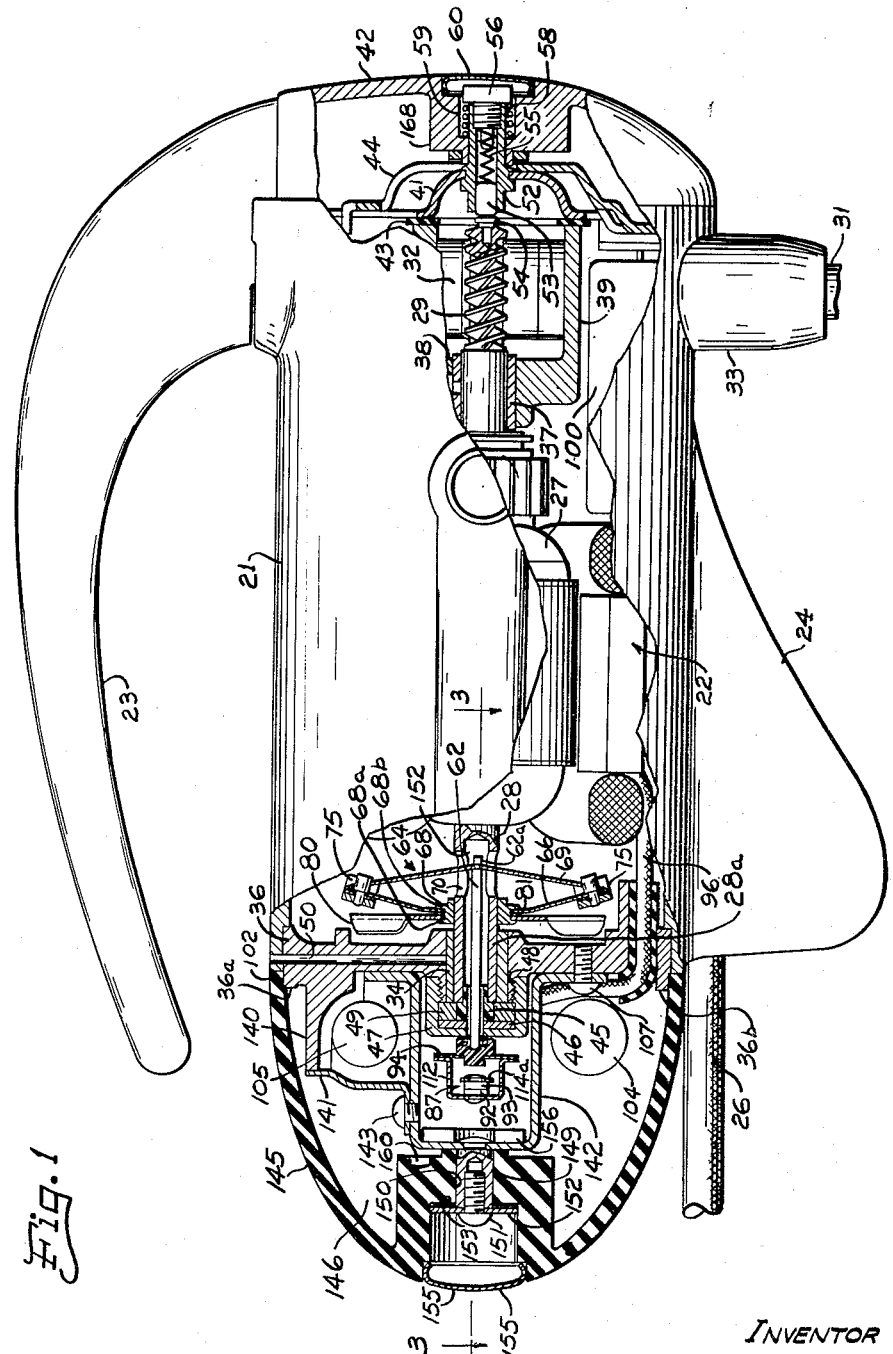

The present invention is concerned with what might be termed a "bow and arrow" construction of a centrifugal governor which is practically friction free and very stable so that a slight misalignment of the parts, unlike prior art constructions, has no detrimental effect on the operation thereof. The centrifugally influenced masses are supported on a mechanism which forms the "bow" of the "bow and arrow" construction while the "arrow" comprises a pin or needle member for transmitting forces to control parts comprising a switch in a motor circuit in response to speed variations of the prime mover driving the governor parts. The pin or needle disposed within and on the axis of the prime mover shaft is of small cross section so as not to interfere with the effective operation of an end thrust button on the end of prime mover shaft. The reason why the governor of the present invention has less friction than other types of governors is based on the inherent self-aligning features of the "bow and arrow" construction with reference to the pin or needle which requires no guiding means. Moreover, it is more stable since it tends to correct misalignment of parts.

It should be understood that the present invention is of general application and the specific disclosure with respect to a food mixer is by way of example only. In the particular application illustrated, there is disclosed the driving unit for an electric food mixer comprising a casing designated generally by the numeral 21, a motor 22 disposed within the casing 21, a handle 23 for manual manipulation of the mixer, a bracket 24 on the bottom of the casing 21 for mounting the mixer on a standard (not shown) and a power attachment cord 26 for connecting the unit with an electric power source. The motor 22 is preferably of conventional construction and includes an armature 27 mounted on a shaft 28 extending axially of the casing 21 and provided at its forward end with a worm 29 adapted for driving engagement with suitable gears, not shown, for rotating spaced vertical beater receiving spindles 31 (one only being shown) suitably supported within bosses 32 and 33 at the top and bottom respectively of the casing.

For the purpose of supporting the shaft 28, there is provided at the rear end of the casing 21 a bearing 34 mounted on an end bracket 36 suitably fastened to the rear end of the casing. The forward end of the shaft 28 is supported by a bearing 37 disposed in an inner end wall 38 of a lubrication chamber 39 for the worm 29 and associated gears. A removable end cap 41, accessible upon removal of a forward end 42 of the casing 21, defines the outer end wall of the lubrication chamber 39. A gasket 43 prevents leakage of lubricant from the chamber in a conventional manner. A link 44 forms a part of a beater release mechanism, of the type disclosed and claimed in United States Letters Patent 2,293,959, assigned to the same assignee as the present invention.

By virtue of the worm gear 29, it will be understood by those skilled in the art that the shaft 28 tends to move in the direction of its longitudinal axis or in other words, an end thrust is effectively applied thereto. In the particular construction illustrated, this end thrust is in a direction toward the rear bearing bracket 36 and to prevent the shaft 28 from moving in an axial direction, there is provided an end thrust bearing button 45 at the end of the shaft 28 adjacent the bearing bracket 36. This thrust bearing button 45 is preferably an annular insert formed of a suitable plastic such as nylon, and inserted into the end of the shaft 28 which is provided with a hollow extension 28a disposed within the bearing 34. The end thrust button 45 preferably has its end face in engagement with a bearing washer 46 supported within a cap 47 threaded on a boss 48 extending axially outward from the rear end bracket 36. A felt lubricating seal 49 surrounds the thrust bearing button 45 and is disposed so as to provide ample lubrication for the thrust bearing surfaces on the members 45 and 46. The end bracket 36 is preferably also provided with a lubricating passageway 50 opening to the exterior of the casing 21 so that lubrication may be supplied to the bearing 34 and also to the felt washer 49. The thrust bearing button 45 is of relatively small diameter so that the end thrust is taken on a low velocity portion of the rotating member, thereby remaining sufficiently cool and avoiding excessive wear by virtue of being constructed to involve a minimum amount of friction.

As will become apparent from the following description, axial movement of means associated with the shaft 28 is relied upon to perform certain control functions with respect to the governor for the motor 22, and it is essential that axial movement of the shaft 28 be completely eliminated since the governor conventionally employed with food mixers is of the type which opens the motor circuit when the speed increases above a preselected value. It is possible that any end play in the motor would cause limited axial movement of the shaft 28 with undesirable speed variations. To prevent this, means are provided to bias the shaft 28 and specifically the thrust member or button 45 into bearing engagement with the thrust washer 46. To this end, there is provided a sleeve 52 at the forward end of the motor 22 suitably supported in coaxial relationship with the shaft 28 by means of the end cap 41. Disposed within the sleeve 52 is a plunger 53 having an end face engageable with the bearing surface on an insert 54 in the forward end of the shaft 28. In order to apply a selected predetermined pressure to the forward end of the shaft 28, there is disposed within the sleeve 52 a compression spring 55, the compression of which is suitably controlled by a screw 56 threaded within the sleeve 52. By appropriately adjusting the screw 56, the desired initial pressure may be applied to the shaft 28 to eliminate any possibility of end play. The screw 56 also preferably holds the forward end 42 of the casing 21 in position to permit limited rotational movement thereof when the handle 23 is actuated to operate the beater release mechanism referred to above. To this end, the casing end 42 is pivotally supported on the sleeve 52 and a suitable compression spring 58 is disposed in a counter bore 59 around the sleeve 52 which spring is compressed by the enlarged head of the screw 56. The spring 58 provides a force which prevents inadvertent rotation of the casing end 42 unless positively moved through manipulation of the handle 23. A closure plate 60 closes the opening in casing end 42 affording access to the screw 56 thereby preventing dust and the like from entering this portion of the casing.

Figure 2:
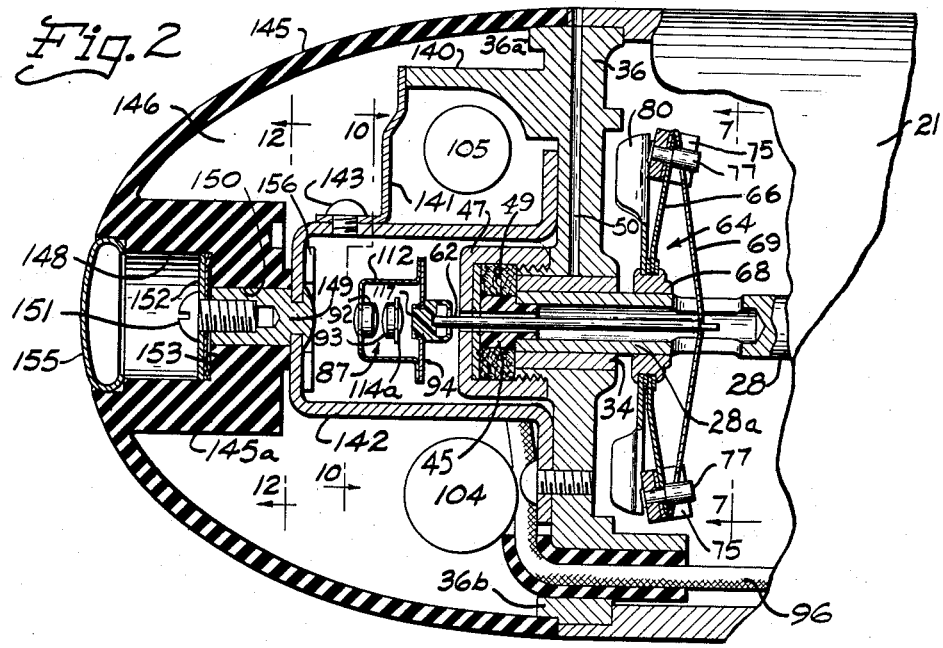
Fig. 2 is a view of a portion of one end of Fig. 1 showing the governor operated switch contacts in an open position.

From the above discussion it will be understood that satisfactory means are provided for taking up the end thrust of the shaft 28 on the bearing bracket 36 which closes one end of the casing 21. In accordance with the present invention, means are provided to bring those parts of the governor requiring ready access thereto outside the bearing bracket 36 which means must not interfere with the thrust action of the thrust bearing button 45. To this end the thrust bearing button 45, the thrust bearing washer 46 and the cap 47 are provided with aligned openings along the axis of the shaft 28 to receive an axially movable pin, rod or needle 62 which has a major portion thereof disposed within the hollow end 28a of the shaft 28. Also in accordance with the present invention, the centrifugally influenced member is preferably supported from the relatively heavy and rigid shaft 28 inside bracket 36 and motion from this centrifugally influenced member is transmitted outside the bracket 36 through the needle or pin 62. This centrifugally influenced member is generally designated by the reference numeral 64 in the drawings. As best shown in Figs. 1, 2 and 7, the speed responsive or centrifugally influenced member 64 includes a pair of diametrically opposed outwardly tapering arms 66 extending outwardly from a hub portion or sleeve 68 suitably secured to the hollow shaft portion 28a. The major portion of the arms 66 are inclined out of the plane of the portion thereof fastened to the hub or sleeve 68 in a direction away from the rear end bracket 36. A resilient connecting link 69 interconnects the outer ends of the arms 66. As best shown in Fig. 7, the connecting link 69 passes through a transversely extending slot or opening 70 in the shaft portion 28a and the end portions of link 69 are inclined in an opposite direction from the direction of inclination of the arms 66. The central portion of the resilient member 69 disposed within the hollow shaft 28a is provided with a sort of hub portion 71 having a non-circular opening 72 therein for receiving a complementary end of reduced cross section 62a of the needle or pin 62. The opening or slot 70 transversely of the shaft 28 is of sufficient length so that the central hub portion 71 of the resilient member 69 may move axially of the shaft 28 in response to speed changes of the motor 22.

For the purpose of relating the outer ends of the arms 66 with the outer ends of the resilient member 69, reference may be had to Fig. 11 of the drawings, where it may be observed that the extreme ends of the resilient member 69 are bent or folded over the ends of the arms 66 to form an interlocking structure therewith. To provide a centrifugally influenced element, each of the arms 66 is provided at its outer end with a weight 75 of generally U-shaped configuration with the bight portion 75a of the U positioned in face to face contact with the folded over portion of the resilient member 69. The legs of the U-shaped member 75 are received within notches 76 cut in the outer end of the associated member 66. A suitable rivet 77 passing through the bight 75a of the U-shaped weight 75, the folded over portion of the resilient member 69, the arm 66 and the main end portion of the resilient member 69 maintains the parts in assembled relation. The main portion of the resilient member 69 is provided with an elongated slot 78 adjacent either end to permit passage of the rivet 77 therethrough upon assembly of the resilient members 69, the weights 75 and the arms 66. It will be apparent that rotation of the speed responsive or centrifugally influenced mechanism 64 would tend to cause the weights 75 to move father in an outward direction, thus tending to bring the arms 66 into the plane of the portion of the hub 68 to which they are attached. This will result in the resilient member 69 tending to straighten out and resulting in axial movement of the pin 62 in a direction to the left as viewed in Fig. 1 of the drawings, whereas a decrease in speed will tend to permit movement of the needle 62 to the right as viewed in Fig. 1. It will be observed that the resilient member 69 and the arms 66 provide the "bow" while the needle 62 provides the "arrow" of the above referred to "bow and arrow" governor construction. As is best shown in Fig. 7 of the drawings, the resilient member 69 has susbtantial width in the direction of the horizontal perpendicular to the needle 62 thus providing lateral stiffness and preventing the centrifugal forces from causing lateral misalignment due to small dissymmetries. The member 69 is very resilient and flexible as far as the other direction of movement is concerned.

In order to maintain the motor 27 and associated parts at a safe temperature, it is generally desirable to provide a suitable fan. To this end, a fan 80 is provided having a plurality of blades and forming a unit with the centrifugally influenced mechanism 64 in that the fan 80 is also suitably supported by the hub 68. As illustrated, the fan 80 is disposed between the speed responsive mechanism 64 and the rear end bracket 36. The blades are so inclined so as to force air through the motor casing in a longitudinal direction. The fan 80 and the arms 66 are separated by a suitable spacer 81 and are held tightly between the shoulders 68a and 68b formed at opposite ends of the hub or sleeve 68.

From the above discussion, it will be observed that there has been provided an arrangement in which the centrifugally influenced member 64 is mounted on a strong and rigid portion of the motor shaft and motion from this centrifugally influenced member is transferred outside the rear bearing bracket 36 through the center of a small opening in the thrust button 45 whereby all control parts of the governor mechanism to be described including current carrying parts, contact springs, switch springs, and the like may be mounted outside the bearing bracket 36 to permit easy access thereto, whereby any malfunctions thereof may be repaired without removing the bearing bracket 36 and hence the armature of the motor 22. The needle or pin 62 has a very small diameter so that it does not deleteriously influence the thrust pin 45 from the standpoint of providing the necessary thrust action, since it requires removal of only a small central portion thereof.

Before considering the structural details of the governor mechanism of the present invention, attention is directed to Fig. 13 which affords an overall picture of the electrical circuit involved. The corresponding parts of Fig. 13 are designated by the same reference numerals as in the structural views of the drawings. The armature 27 of the motor is illustrated, as are also the field windings 82 and 83. As illustrated, the power cord 26 is connected by conductors 84 and 85 to the motor circuit including the field windings 82 and 83 connected in series with the armature 27 through a circuit comprising a main control switch 86 and a governor controlled switch 87. This circuit may readily be traced in Fig. 13 as follows: from one side of power cord 26 through conductor 84, field winding 82, conductor 88, the contacts 89 and 90 of the main control switch 86, conductor 91, the contacts 92 and 93 of the governor controlled switch 87, conductors 94, 95 and 96, brush 97, armature 27, brush 98, conductor 99, field winding 83 and conductor 85, back to the other side of power cord 26. Whenever the switches 86 and 87 are closed and power cord 26 is connected to a source of power, it will be apparent that the armature 27 will rotate with the resultant rotation of the motor shaft 28. To eliminate radio interference, condensers 100 and 101 serially arranged are connected across the power lines 84 and 85. The common terminal of the condensers 100 and 101 is preferably also connected to ground through a condenser 102. As has been mentioned above, speed control of the armature 27 is obtained through opening and closing the governor controlled switch 87 in response to movement of the weights 75 and consequently the needle 62. Thus, periodic opening of the contacts 92 and 93 will occur and to prevent arcing, a suitable capacitor 104 is connected across the serially arranged switch means 86 and 87. For the purpose of dissipating the energy stored in the capacitor 104, a resistor 105 is provided which is connected across the governor controlled switch means 87.

Figure 3:
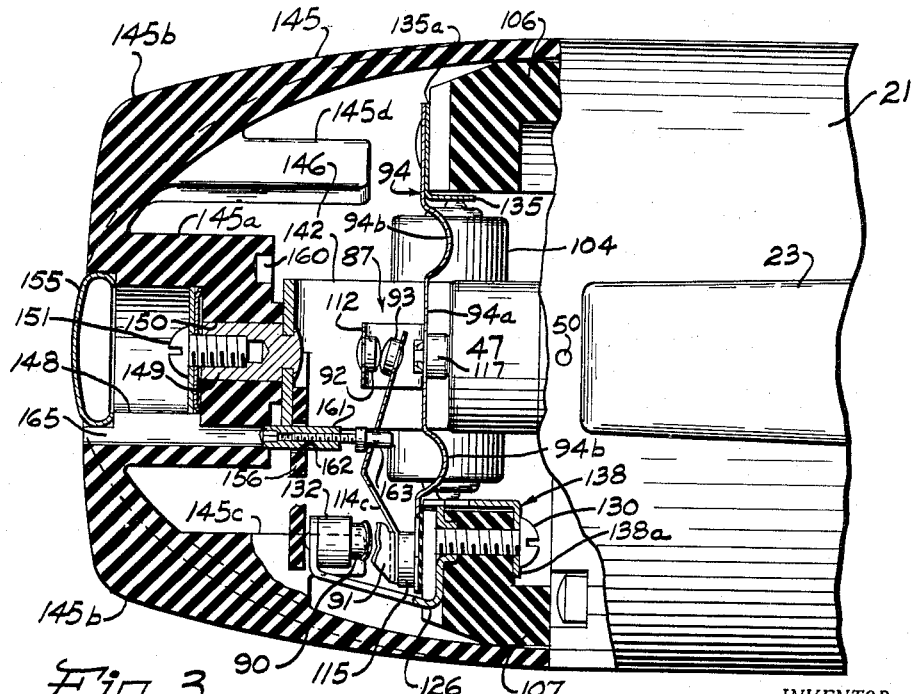
Fig. 3 is a view partly in section, taken along line 3—3 of Fig. 1 assuming that Fig. 1 shows the complete structure.

Considering now the structural details of the elements schematically disclosed in Fig. 13, consideration is first given to the governor controlled switch 87 which comprises a resilient member 94 supported from the end bracket 36 and spaced therefrom by insulating blocks 106 and 107, best shown in Figs. 3 and 4 of the drawings, and secured to the end bracket 36 as by screws 108. The ends of the resilient member 94 are riveted as indicated at 109 to the insulating blocks 106 and 107 respectively. The center portion 94a is offset from the end portions of the spring 94 by loops or folds 94b. The design of the resilient member 94 is preferably such that the resilient member is stressed in compression so that the central portion 94a is normally bowed slightly in the direction of the bracket 36. By virtue of the offset arrangement, the spring or resilient member 94 is provided with a fairly straight-line load deflection curve over the distance it is operated so that wearing down of the governor controlled switch contacts 92 and 93 will not produce any deleterious effect. The resilient spring member 94 effectively provides a support for the contact 92 of the governor controlled switch, which may be referred to as the movable contact, since it is movable in response to movement to the needle 62, as will be brought out in the following discussion. As specifically illustrated, a U-shaped bracket 112 is supported from the central portion 94a of the resilient spring 94 on the side thereof remote from the bracket 36. The movable contact 92 is supported from this U-shaped bracket 112 as clearly shown in Figs. 2, 3 and 10 of the drawings. The U-shaped bracket 112 is preferably spot-welded to the spring 94 and the contact 92 is preferably riveted to the bracket 112.

In order to support the stationary contact 93 of the governor controlled switch 87, there is provided an adjustable contact arm 114 of somewhat Y-shaped configuration, comprising arms 114a, 114b and 114c. The stationary contact 93 is illustrated as being supported from the leg 114a of the Y 114. The other two legs 114b and 114c of the Y are supported from the insulating support 107 in spaced insulated relationship with respect to the end of the spring 94 also fastened thereto by insulated washers 115. The rivets 109 hold one end of spring 94 to block 107 and also pass through the washers 115 to support the Y 114. The contact 93 is referred to as a stationary contact because, during normal operation of the device, it essentially comprises a stationary element of the switch 87. Actually, as will become apparent from the following description, contact 93 is movable to select the predetermined desired operating speed of the motor 22.

In order to cause relative movement of contacts 92 and 93 in response to movement of the centrifugally influenced member 64, the end of needle or pin 62 extending outside the bracket 36 is rounded as indicated at 62b in Fig. 6 of the drawings, and is received in a recess 116 of a bearing member 117 preferably formed of a molded plastic such as nylon. The bearing member 117 is supported on the center portion 94a of the resilient spring member 94 as by having an extension of reduced cross section 117a received within an opening 118 at the center of the portion 94a of the spring 94. Preferably the opening 118 is of non-circular configuration and the extension 117a is of complementary shape so that the bearing member 117 is prevented from rotating within the opening 118 of spring member 94. In order to reduce friction to a minimum, the end 62b of the needle or pin 62 is rounded as indicated, and the bottom 116a of the recess 116 is so shaped as to provide point bearing contact. A lubricating washer 120 is illustrated as being provided encircling the end of the needle 62 disposed within the recess 116. This washer 120 may be retained within a counter bore 121 of the recess 116 as by having the outer edge 117b of the bearing member 117 peened over as shown in Fig. 6, thereby securing the lubricating washer in assembled relation. With this arrangement, it will be apparent that there has been provided a substantially frictionless arrangement for transferring motion from the centrifugally influenced member 64 to the governor controlled switch 87. Furthermore the small needle or pin 62 for transferring motion from inside a motor housing to the outside has a self-aligning effect so that even though the nylon bearing member 117 supported by the resilient member 94 should not line up exactly with the center of the shaft 28, axial motion of the centrifugally influenced governor parts can still be transmitted to the spring member 94 without setting up any side vibrations in this spring member. Moreover, by fastening the main contact spring 94 at both ends linear motion at the center of the spring where the nylon member 117 is fastened is obtained and this linear motion is in line with the motor axis at all times.

The main switch 86 is provided so that the motor 22 may have an off or deenergized position, if desired, and this main switch 86 is best shown in Figs. 3, 5, 8 and 9 of the drawings. As illustrated, the contact 90 of this main switch comprises the movable contact, whereas the contact 89 comprises the stationary contact. The movable contact 90 is carried on the free end of a cantilever mounted resilient member 91 supported from one edge of the insulating block 107, and electrically connected with the leg 114c of the Y 114. If desired, resilient member 91 may actually comprise an integral lateral extension of leg 114c. As illustrated, the end of the spring member 91 is in face to face contact with the leg 114c of the Y-shaped member 114, while the free end is deformed out of the plane of its mounted end and is in spaced relation with the block 107. A tongue 127 on the leg 114c, as best seen in Figs. 8 and 10, interfits in a groove 128 on the cantilever mounted end of the resilient member 91 to maintain the resilient member in a predetermined position. These structural details are obviated if the resilient member 91 is an integral extension of the Y-shaped member 114.

The stationary contact 89, on the other hand, is mounted on a lateral flange 126a of a somewhat U-shaped conducting bracket 126 having its leg or flange 126b secured to the insulating block 107 by means of the screw 130. The flange 126b of the bracket 126 is received within a recess 131 formed in the insulating block 107. This bracket 126 is constructed and positioned so that the contact 90 is normally biased into conducting engagement with the contact 89.

To aid in extinguishing any arc drawn between the contacts 89 and 90, there is provided an arc chute 132. As shown, this arc chute 132 comprises a tubular member of insulating material of slightly larger diameter than the contacts 89 and 90. Preferably, the arc chute 132 is held in position as illustrated by the contact 89 which is formed as a rivet. To this end, the closed end of the arc chute 132 has an opening 133 for receiving an enlarged shank portion 89a of the contact rivet shank disposed between the contact head 89 thereof and the flange 126a of the bracket 126. The length of the shank 89a is preferably greater than the thickness of the closed end of the chute 132 and the diameter of the opening 133 is larger than the diameter of the shank so as to form an arc chute mounting that permits limited universal movement of the chute relative to the contact 89. Since the contact 90 axially swings in an arc about its cantilever end, the above construction insures that contacting engagement of the contacts 89 and 90 of the main switch 86 may be made without sticking of the movable contact 90 in the arc chute 132.

For the purpose of supporting the condenser 104 and the resistor 105 in a readily removable manner to permit ready replacement thereof when necessary or desirable, these elements are removably supported in diametrically opposed positions on the end bracket 36 as best shown in Figs. 2, 5 and 10 of the drawings. The resistor 105 is mounted at the top of the end bracket in spaced relation thereto by suitable supporting clips 135 and 136. The clip 135 common to both the resistor 105 and the capacitor 104 is secured to the insulating block 106 as by a mounting flange 135a being disposed between one of the mounting ends of the resilient spring member 94 and the insulating block 106 as best shown in Figs. 3 and 4. Near the opposite end of the clip 135 (see Figs. 5 and 10) there is provided an integral terminal 135b connected to the conductor 96 leading to the motor brush 97, shown schematically in Fig. 13 of the drawings. The clip 136 is somewhat L-shaped and includes an offset flange 136a which flange is clamped to the insulating block 107 in face to face relationship with the leg 114b of the Y-shaped member 114 as shown in Fig. 10. The condenser 104 is mounted below the resistor 105 by the clip 135 and a clip 138. The clip 138 (see Fig. 4) is secured to the insulating block 107 by the same screw 130 which holds the bracket 126 in position. This screw 130 passes through an offset flange 138a of the clip 138, which clip also includes an offset terminal flange 138b connected to the conductor 88 leading to the field winding section 82 as best shown in Fig. 13 of the drawings. The common clip 135 for the resistor 105 and the condenser 104 and the clips 136 and 138 respectively are biased so that they must be spread apart slightly to receive and support the resistor and condenser and electrically connect the same in the circuit as indicated schematically in Fig. 13 of the drawings. This construction assures that the condenser 104 and the resistor 105 are positively held in position while at the same time insuring that they can be readily removed as required for replacement and the like.

From the above discussion, it will be understood that the making and breaking of the contacts comprising the governor controlled switch 87 will cause a substantial amount of heat to be dissipated in the resistor 105. In order to prevent this heat from causing "hot spots" on the exterior surface of the casing 21 or any of the associated parts to be described hereinafter, there is provided, in accordance with one phase of the present invention, a heat dissipator generally designated at 140 in the drawings and best shown in Figs. 1, 2, 5 and 10 thereof. This heat dissipator 140 effectively comprises a fin integrally formed and projecting as a shelf from the bracket 36 above the resistor 105. It will be understood that this fin could be a separate element fastened to the bracket 36, if desired. Preferably this fin is formed of a material having good heat conducting characteristics such, for example, as aluminum. As illustrated, the ends of the fin 140 preferably curve downwardly to provide maximum effectiveness. With this construction heat from the resistor 105 is radiated to the heat dissipating fin 140 whereby it is readily conducted to the bracket 136 and distributed over a large area cooled by the cooling air forced through the casing 21 by the fan 80. The resistor 105 is further shielded in accordance with the present invention by means of a shield plate 141 also formed of a material having good heat conducting characteristics which is suitably fastened to a bracket member 142, described in detail hereinafter, by screws or fastening means 143. This shield or plate 141 is best shown in Figs. 1 and 2 of the drawings and it may be observed that the free end thereof presses against the end of the fin 140 so as effectively to provide an enclosure for the resistor 105 which enclosure is open at each end to permit air circulation. The shield plate 141 conducts heat to the bracket 142 which latter bracket is of U-shaped configuration and is suitably fastened to the end bracket 36 of the motor casing 21.

In the above mentioned Jepson Patent 2,274,480, there is disclosed a control knob for controlling the motor speed which is in the form of an extension of the casing blending therewith in a pleasing manner and providing a large surface which may readily be grasped by the operator and which surface may also accommodate suitable indicia for indicating the operating condition of the mixer. This feature has proved unusually successful and is again incorporated in the present device except that since the centrifugally influenced parts 64 are disposed inside of the end bracket 36, the control knob employed with the present invention truly defines a casing extension since no other enclosure for the parts of the speed control means except the centrifugally influenced member 64 is provided. As best shown in Figs. 1, 2 and 3 of the drawings, there is provided a control knob or dial 145 which control comprises an extension of the casing 21 in order to house the governor parts. This control knob or dial 145 has the appearance of a parabolic body extending outwardly from the rear of the casing 21 and defining a continuation thereof. This knob 145 is hollow so as to define a large chamber 146 therein for the governor parts already described as well as other parts to be described. The knob 145 is assembled with the casing 21 so as to overlie and be supported by arcuate projecting flange parts 36a and 36b forming an integral part of the bracket 36. Preferably a very slight clearance is provided between the knob or dial 145 and these arcuate projections 36a and 36b to permit rotation thereof.

For the purpose of rotatably supporting the knob 145 in the position shown in Figs. 1, 2 and 3 of the drawings, the dial 145 is preferably provided with a central hub portion 145a having a recess or counter bore 148 defined therein. The bracket 142 is preferably a dial bracket of U-shape which is provided with an axially extending stub shaft 149 riveted to the bight portion of the U. This stub shaft 149 extends into a suitable opening 150 in the hub 145a which effectively provides a bearing for the rotatable knob 145. A suitable screw 151 threaded into the stub shaft 149 holds the knob 145 in relatively rotatable position about the longitudinal axis of the casing 21. The screw 151 is disposed within the recess or counter bore 148 as is also a washer 152 and a spring washer 153. The spring washer 153 maintains the desired tension between the parts whereby the knob 145 is held in proper assembled relationship with the casing 21. A closure plate 155 is illustrated as disposed within the end of the counter bore or recess 148 to close the same.

For the purpose of enabling the operator readily to grasp the knob or dial 145, the latter is preferably provided with wing portions 145b arranged in diametrically opposed relationship as clearly shown in Fig. 3 of the drawings. These wings 145b provide a convenient grasping means for ready manipulation of the control dial 145.

With the arrangement described thus far, it is apparent that there has been provided a complete casing for the motor and control units of which the dial 145 is an essential portion defining the chamber 146 within which are disposed the condenser 104, resistor 105, the governor controlled switch 87, the main switch 86, etc. In addition to serving as a housing, however, the control knob or dial 145 also functions as a control member for controlling the main switch 86 and additionally as a speed control device for selectively controlling the governor controlled switch 87. In order that the dial 145 may control the main switch 86, the dial 145 is preferably provided with an integral projection 145c best shown in Figs. 3, 4, 8 and 9 of the drawings. This projection 145c extends axially inwardly into the chamber 146 and has a generally tapering end. Furthermore, it is positioned so that when the dial 145 is in its off position (see Fig. 8 of the drawings), the projection 145c engages with the resilient contact arm 91 to open the main switch 86. The projection 145c also acts as a stop to limit rotation of the dial 145 in one direction by virtue of engagement with a shoulder on one side of an insulating strip 156 attached to the bridging portion or bight of the U-shaped bracket 142 and overlying the flange 126a supporting the contact 89 of the main switch 86. When the projection 145c engages with this shoulder of the stop 156, the extreme end of the projection 145c engages the free end of the contact carrier 91 to separate the contacts 89 and 90. A rounded shoulder 91a on the resilient contact carrier 91 acts as a stop to hold the projection 145c in the off position and thereby prevents accidental starting of the motor 22. The shoulder 91a and projection 145c also act as a cam and follower mechanism to effect sufficient initial separation of the contacts 89 and 90 to insure interruption of the flow of power current to the motor 22. The shoulder 91a and the projection 145c are also shaped so that only a relatively small but positive pressure must be applied to the dial 145 before it can be rotated to permit closing of the main switch 86.

In order to limit rotation of the control knob 145 in the opposite direction, an additional projection 145d is provided quite similar to the projection 145c and disposed in a somewhat diametrically opposed position as is clearly shown in Fig. 3 of the drawings. The projection 145d engages the opposite side of the stop member 156 thereby limiting rotation in the opposite direction of the knob 145.

It will be understood that selective variation in the speed of motor 22 may be obtained by varying the axial position of the so-called stationary contact 93 of the governor controlled switch 87, the movable contact 92 being controlled by the centrifugally influenced governor parts 64. To this end the inner face of the hub 145a is provided with an arcuate cam slot 160 which is relatively shallow at one end and relatively deep at the other end as best shown in Fig. 14 of the drawings, so that axial movement of a cam follower may be obtained by mere rotation of the slot 160 and hence rotation of the knob 145. Accordingly, there is provided a cam follower 161 supported for axial motion in an opening 162 defined in the stop member 156. This cam follower has one end, as clearly indicated in Figs. 3 and 15 of the drawings, disposed within the arcuate cam slot 160 while its other end is provided with an adjustable member 163, threadedly related to the cam follower 161, and inserted within an opening in the leg 114a of the Y-shaped resilient member 114. The cam follower 161 thus essentially comprises two parts threadedly interrelated so as to provide for longitudinal adjustment thereof for initially adjusting the cam follower to provide the desired speeds correlated with the arcuate cam groove 160 and consequently with predetermined angular positions of the knob 145. A suitable passageway 165 is provided within the control knob 145 so that adjustment of the length of the cam follower 161 may be made. It will be noted from Fig. 15 of the drawings that the bottom of the groove or arcuate cam slot has a V-shaped cross section, whereupon the cam follower 161 touches the bottom of the groove near each edge. This prevents the cam follower 161 from catching on the edges of the passageway 165 as well as reduces the area of frictional engagement between the cam slot 160 and cam follower 161. Preferably, the outer surface of the control knob 145 is calibrated with suitable indicia also setting forth the operating function intended to be performed by the motor at particular speeds thereof as is clearly disclosed and claimed in the above mentioned Jepson patent.

From the above description, it will be apparent that the control knob 145, which is preferably formed of a molded plastic such as Bakelite or the like, forms the only enclosure for the switch mechanism and the like, thereby eliminating rather difficult to manufacture castings required in prior art devices. The dial bracket 142 is an inexpensive stamping which can be secured to the bracket 36 and since it merely holds the control knob in position, it does not have to be either as strong or as accurate as the expensive brackets required heretofore to take the motor bearing thrust. It will be noted also that the shield plate 141 shields the control knob 145 from the heat of the resistor 105. The heat radiating plate 141 and the bracket 142 are both simple sheet metal stampings of inexpensive construction. The knob 145 may be removed by taking out a single screw 151 whereupon complete access to all the governor parts except the centrifugally influenced parts is afforded without interference from bracket members or the like as was the case with prior art arrangements. Furthermore, the removal of the control knob 145 provides such complete access without in any way interfering with the thrust bearing mounting as would be the case if such complete access were necessary in prior art arrangements.

In view of the detailed discussion included above, the operation of the new and improved control arrangement of the present invention will readily be understood by those skilled in the art. Assuming that the main switch 86 is open as shown in Fig. 8 of the drawings wherein the dial 145 is in its "Off" position and the projection 145c engages the free end of the resilient member 91 and holds the contact 90 in spaced relation with the contact 89, the central portion 94a of the resilient member 94 is bowed in the direction of the end bracket 36 and the contact 92 is biased into engagement with the contact 93 so that the governor controlled switch 87 is in its closed position. To start the motor the operator rotates the dial 145 and sets it for a preselected speed of operation. This rotation of the dial 145 moves the projection 145c so that it clears the shoulder 91a and permits contact 90 to engage contact 89. Current thereupon flows to the motor 22 to energize the latter and cause the shaft 28 to rotate. As the shaft picks up speed, weights 75 are moved outwardly from their initial position shown in Fig. 1 of the drawings to a position such as shown in Fig. 2 due to centrifugal action. As the weights 75 move outwardly from their initial position due to the increased speed of rotation of the shaft 28, the hub portion 71 of the connecting link 69 tends to move axially toward the rear end of the casing 21. As a result the needle 61 is urged bodily rearwardly moving the center portion of the resilient member 94a axially of the end of the shaft 28.

This movement continues until the contact 92 moves away from the contact 93 as shown in Fig. 2 of the drawings. When the switch 87 opens, the flow of power to the motor is interrupted and the motor speed falls off. Such decrease in motor speed causes the weights 75 to move toward their initial positions and the bowed central portion 94a, which now exerts a greater force than the force moving the needle 62 axially rearwardly, urges the contact 92 into engagement with the contact 93 and closes the switch 87 to again permit power to flow to the motor. As a consequence, the motor shaft 28 is again accelerated so that the weights 75 move outwardly and move the needle 62 axially to open the switch 87. Thus, the speed of the shaft 28 is controlled by intermittently interrupting the flow of power to the motor 22.

The speed of operation is determined by the axial position of the contact 93. The position of the latter is controlled by the cam surface 160 formed on the end face of the hub 145a and the adjustable cam follower 161 associated therewith. The arcuate cam surface 160 of varied depth permits the operator to set the dial for any speed of operation within the speed range of the motor.

The speed control means described above is extremely simple in construction, has a minimum number of parts so that manufacturing costs are low and may be readily assembled. This construction in effect provides a substantially frictionless drive between the governor weights 75 and the governor controlled switch 87 since the only friction surface between these members is the bearing surface between the needle 62 and the bearing member 117 and this is substantially a point contact. Accordingly, this speed control means is extremely efficient and very sensitive to small speed changes. Moreover, the "bow and arrow" construction of the centrifugal governor has numerous advantages over prior art arrangements in that it is practically friction free and very stable. The reason why it requires less friction than other governors is that it is not necessary to guide the pin 62 in the axially extending passageway of the shaft portion 28a, which guiding is required of prior devices. The reason why the pin 62 does not have to be guided is because the construction of the governor is such that when you apply pressure at the end of the pin 62, the "bow string" 69 has a tendency to align itself with the center of the shaft axis. This is shown in Fig. 16 of the drawings and it will be noted that the forces acting on the center of the "bow string" are such that if the pin 62 is off center, there is a tendency to bring it back represented by the resultant force $F_1$. An examination of Fig. 17 showing a prior art type governor indicates that exactly the opposite would be true, since if the force is applied slightly off center, there is a resultant force acting in a sense to bring the pin further out of alignment represented by the force $F_2$. The thrust bearing support for the rear end of the shaft 28 and the spring loading mechanism at the forward end of the shaft 28 holds the latter against axial movement thereby also assuring an extremely accurate governor construction.

Although there has been described and illustrated a specific embodiment of the present invention, it will be understood that various changes and modifications will occur to those skilled in the art, and it is aimed in the appended claims to cover all such changes and modifications as fall within the true spirit and scope of the present invention.

What is claimed as new and desired to be secured by Letters Patent of the United States is:

1. In an appliance, the combination of a motor including an end bracket and a shaft supported at one end by said end bracket, a first contact disposed in spaced axial relation with respect to said shaft, means for supporting said first contact to vary the relative axial position of said contact with respect to said shaft, a movable contact engageable with said first contact, a resilient member for carrying said movable contact, means for mounting the ends of said resilient member spaced apart to bow said resilient member in the direction of said shaft normally to bias said movable contact into engagement with said first contact, a control circuit including said motor and said contacts, governor means mounted on said shaft on the opposite side of said end bracket from said contacts and means actuated by said governor means disposed between said governor means and said resilient member operable to move said resilient member to control the engagement and disengagement of said movable contact with the first contact to maintain a preselected motor speed.

2. In an appliance, the combination of a motor including an end bracket, a shaft supported at one end by said end bracket and an electric circuit, a first contact in said circuit disposed in spaced axial relation to the end of the shaft, means for supporting said first contact, means for adjusting the relative position of said contact with respect to said shaft, a movable contact in said circuit disposed adjacent said first contact, a resilient member disposed between the end of the shaft and said first contact for supporting said movable contact to be normally engageable with the first contact and speed responsive means mounted on said shaft on the opposite side of said end bracket relative to said contacts operative to move said resilient member to move said movable contact into and out of engagement with said first contact to open and close the electric circuit to maintain a preselected motor speed.

3. In an appliance, the combination of a motor including an end bracket, a shaft supported at one end by said end bracket, and a motor circuit, insulating blocks mounted on the outwardly facing side of said end bracket on diametrically opposite sides of said shaft, a first contact in said motor circuit, means for supporting said contact in spaced axial relation to the end of the shaft, a resilient member having its ends attached to said blocks and having a portion spanning the space between said blocks and disposed between said first contact and the end of the shaft, a movable contact in said motor circuit, means for mounting said movable contact on said resilient member to be engageable with said first contact and speed responsive means mounted on said shaft on the opposite side of said end bracket from said contacts operative to move said resilient member to control the movement of said movable contact into and out of engagement with said first contact to control the flow of power to the motor to maintain a preselected speed of rotation of said shaft.

4. In an appliance, the combination of a motor including an end bracket and a shaft supported by said end bracket, a first contact in spaced axial relation to said shaft facing outwardly therefrom, a first resilient member having an end supporting said first contact, means forming a cantilever mounting for the opposite end of said first resilient member, means engageable with said first resilient member for adjusting the axial position of said first contact with respect to the shaft, a second resilient member disposed between said first contact and the shaft, insulating means on diametrically opposite sides of said shaft, means for attaching the ends of said second resilient member to said insulating means, means for securing said insulating means to said end bracket at positions to bow said second resilient member in the direction of said shaft, a bracket mounted on said second resilient member having a portion disposed on the outer side of said first contact, a movable contact carried on said portion normally biased into engagement with said first contact, a control circuit including said motor and said contacts, governor means mounted on said shaft on the opposite side of said end bracket from said contacts and means actuated by said governor means disposed between said governor means and said resilient member operable to control the engagement and disengagement of said movable contact with the first contact to maintain a preselected speed of rotation of said shaft.

5. For use with a governor controlled electric motor including an end bracket and a shaft supported by said end bracket, a first contact in spaced axial relation to said shaft and facing outwardly therefrom, said first contact being disposed at one side of said end bracket, means for supporting said contact, a resilient member disposed between said first contact and the shaft, insulating means on diametrically opposite sides of said shaft, means for attaching the ends of said resilient member to said insulating means to bow said resilient member in the direction of said shaft, a U-shaped bracket mounted on said resilient member having a bridging portion disposed on the opposite side of said first contact, a movable contact facing said first contact carried on said bridging portion and normally biased into engagement with said first contact, governor means mounted on said shaft on the opposite side of said bracket from said first contact, and means actuated by said governor means for controlling the engagement and disengagement of said movable contact with the first contact to maintain a preselected speed of rotation of said shaft.

6. For use with a governor controlled electric motor including an end bracket and a shaft supported by said end bracket, a first contact disposed in spaced axial relation to said shaft and on one side of said end bracket, means for supporting said contact, spaced insulating means on diametrically opposite sides of said shaft, means for securing said insulating means to said end bracket, a bracket having a portion disposed on the side of said first contact away from said end bracket, a movable contact mounted on said bracket, a resilient member disposed between said first contact and said end bracket comprising end portions, a central portion disposed at one side of the plane of the end portions and a looped portion interconnecting the central portion with the end portions, means for securing said bracket to said central portion of the resilient member, means for securing said end portions to the insulating members to bias the movable contact into engagement with said first contact and speed responsive means disposed on the other side of said end bracket for controlling the axial position of the central portion of the resilient member to control the engagement and disengagement of the movable contact with the first contact in response to speed changes of said shaft whereby to maintain a preselected speed of rotation thereof.

7. In an appliance, the combination of a motor including an end bracket and a shaft supported at one end by said end bracket, said end of the shaft having a transversely extending slot and an axially extending passageway, a first contact in spaced axial relation to said end of the shaft, means for supporting said contact, a movable contact engageable with said first contact, resilient means for mounting said movable contact, means for mounting opposite ends of said resilient means to bow the latter in the direction of said end of the shaft to urge the movable contact into engagement with the first contact, a control circuit including said motor and said contacts, speed responsive means mounted on said shaft on the opposite side of said end bracket from said contacts including a pair of radially extending resilient arms, a weight mounted on the ends of each arm and a resilient connecting link connected to the ends of said arms and extending through said transversely extending slot, a rod disposed in said axially extending passageway interlocked with said connecting link for rotation therewith and having an end extending outwardly of said passageway, and bearing means mounted on said resilient means in alignment with said passageway for receiving the end of said rod and operable to transmit axial movement of said rod to effect movement of said movable contact in response to changes in position of said weight to maintain a preselected speed.

8. In an appliance, the combination of a motor including an end bracket and a shaft supported at one end by said end bracket, said end of the shaft having a transversely extending slot and an axially extending passageway, a first contact in spaced relation to said end of the shaft, means for supporting said contact, a movable contact engageable with said first contact, resilient means for mounting said movable contact, means for mounting the opposite ends of said resilient means to bow the latter in the direction of said end of the shaft to urge the movable contact into engagement with the first contact, a bearing member of synthetic resinous material having a recess in axial alignment with said passageway, means for mounting said bearing member on said resilient member to positively secure the bearing member thereon, a control circuit including said motor and said contacts, speed responsive means mounted on said shaft on the opposite side of said end bracket from said contacts including a pair of generally radially extending resilient arms, a weight mounted on the end of each arm and a resilient connecting link connected to the end of each arm and extending through said transversely extending slot, and a rod disposed in said axially extending passageway interlocked with said connecting link for rotation therewith and having an end extending outwardly of said passageway to be rotatably receivable in said recess on the bearing member and operable to move said movable contact into and out of engagement with said first contact in response to changes in speed of said responsive means to control the speed of operation of said motor.

9. The combination recited in claim 8 with lubricating means disposed in said recess for lubricating the bearing surface between the rod and the bearing member.

10. The combination recited in claim 8 with means for mounting said shaft to hold the latter against axial movement.

11. In an appliance, the combination of a motor having an end bracket, a control means for said motor including a resistor, means for mounting said resistor in a horizontal position adjacent the top of said end bracket, a rotatable control knob adjacent said end bracket for actuating said control means and having a chamber for receiving said control means and resistor and a fin projecting outwardly of said end bracket in overlying relation to said resistor for dissipating the heat thereof to prevent the formation of hot spot areas on the control knob.

12. In an appliance, the combination of a motor having an end bracket formed of metal having good heat conducting characteristics, a casing for said motor, control means for said motor including a resistor, means for mounting said control means adjacent said end bracket, a control dial forming an extension of said casing and having a chamber for receiving said control means, means for mounting said control dial to be manually rotatable between preselected control positions, a heat dissipating fin having good heat conducting characteristics projecting axially outwardly of the end bracket to overlie the resistor and means spaced outwardly from the resistor in face to face relation with the end bracket for reflecting heat from the resistor to the fin and end bracket whereby the heat of the resistor is conducted to the end bracket and casing to be dissipated over a relatively large surface area and thereby prevent the formation of areas of concentrated heat on the control dial.

13. In an appliance, the combination of a casing, a motor disposed in said casing having an end bracket formed of metal having good heat conducting characteristics, control means for said motor including a resistor, means for mounting the control means adjacent said end bracket of the motor, a control dial forming an extension of said casing and having a chamber for receiving said control means, means for mounting said control dial to be manually rotatable between preselected control positions, a metallic heat dissipating fin having good heat conducting characteristics integral with and projecting axially outwardly of the end bracket to overlie the resistor, said fin having its end portions deformed in the direction of the resistor, and a heat shield spaced outwardly from the resistor for reflecting heat from the resistor to the fin and end bracket to prevent the formation of areas of concentrated heat on the control dial and casing.

14. In an appliance, the combination of a motor having an end bracket, control mechanism for controlling the operation of the motor mounted on and extending axially outwardly from said end bracket and a manually operable control dial rotatably mounted on said end bracket and operable to actuate said control mechanism, said dial having a chamber for receiving said control mechanism and a peripheral edge shaped to be adjacent said end bracket to define the sole housing for said control mechanism.

15. In an appliance, a motor having an end bracket, a control mechanism for said motor adjacent said end bracket including a stop and start switch, a speed responsive actuated switch, a condenser and a resistor, means for mounting said switches on said end bracket to extend outwardly from the motor, means for mounting said condenser and resistor on said end bracket to extend outwardly from said motor, a generally parabolic shaped control dial adjacent the end bracket for actuating said control mechanism and having an end adjacent said end bracket and a chamber for receiving said switches, said condenser, said condenser mounting means, said resistor and said resistor mounting means and forming the sole housing therefor whereby upon mere removal of said control dial access to said control mechanism including said stop and start switch, said speed responsive actuated switch, said condenser and said resistor is afforded, and means for rotatably mounting said dial on said end bracket to permit manual rotation thereof between preselected control positions.

16. In a governor controlled electric motor of the type comprising a motor shaft subject to end thrust, a pair of end brackets, a thrust button associated with one end of said shaft for transmitting said end thrust to one of said end brackets, centrifugally influenced means including rotating parts mounted on said shaft between said end brackets, and a longitudinally movable needle extending through said thrust button and a portion of said shaft for transmitting motion from said rotating parts to the side of said one end bracket remote from said other end bracket.

17. In a governor controlled electric motor of the type comprising a motor shaft subject to end thrust, an end bracket, a thrust button attached to the end of said shaft adjacent said end bracket for transmitting said end thrust to said end bracket, said thrust button having a face of relatively small diameter frictionally engageable with an end thrust surface supported by said end bracket whereby the velocity of movement of the frictionally engaging parts is relatively low, centrifugally influenced means mounted on said shaft, means defining a passageway along the axis of said shaft through said thrust button, and a longitudinally movable needle extending through said passageway for transmitting motion from said centrifugally influenced means to the other side of said end bracket.

18. In a governor controlled electric motor of the type comprising a motor shaft subject to end thrust, an end bracket, a thrust button associated with one end of said shaft for transmitting said end thrust to said end bracket, centrifugally influenced means supported on said shaft on one side of said end bracket for rotation therewith including a member movable in a direction along the axis of said shaft in response to variations in the speed of rotation of said shaft, a plurality of control means including switch contacts and electrical circuit elements disposed on the other side of said bracket and means for transmitting motion from said member to said control means through said thrust button to cause said control means to perform a control function.

19. In a speed controlled electric motor of the type comprising a motor shaft subject to end thrust, a pair of end brackets, a thrust button associated with one end of said shaft for transmitting said end thrust to one of said end brackets, centrifugally influenced means mounted on said shaft between said end brackets, a spring mounted contact supported on the other side of said one end bracket, and a longitudinally movable needle extending through said thrust button and a portion of said shaft for transmitting motion from said centrifugally influenced means to said spring mounted contact.

20. In combination with an electric motor of the type comprising a motor shaft subject to end thrust, an end bracket, a thrust button associated with one end of said shaft for transmitting said end thrust to said end bracket, centrifugally influenced means mounted on said shaft, control means including a pair of switch contacts mounted on the side of said bracket remote from said centrifugally influenced means, a longitudinally movable needle extending through said thrust button and a portion of said shaft for actuating said one of said switch contacts in response to operation of said centrifugally influenced means, a hollow control knob rotatably supported from said bracket and forming the sole housing for said control means, and means for causing movement of the other of said contacts in response to rotation of said knob.

21. In a governor controlled electric motor of the type comprising a motor shaft subject to end thrust and switch means for periodically opening and closing the motor circuit to control the speed thereof, an end bracket, a thrust button attached to the end of said shaft adjacent said end bracket for transmitting said end thrust to said end bracket, said thrust button having a face of relatively small diameter frictionally engageable with an end thrust surface supported by said end bracket whereby the velocity of movement of the frictionally engaging parts is relatively low, centrifugally influenced means including rotating parts mounted on said shaft, means defining a passageway along the axis of said shaft through said thrust button, a longitudinally movable needle extending through said passageway for transmitting motion from said centrifugally influenced means to the other side of said end bracket to said switch means, and manual means for controlling said switch means to cause said motor selectively to assume certain predetermined speeds.

22. In a variable speed electric motor of the type comprising a selectively controlled switch means for periodically opening and closing the motor circuit to control the speed thereof, an end bracket, a motor shaft journalled in said end bracket, a thrust button associated with one end of said shaft for transmitting said end thrust to said end bracket, centrifugally influenced means mounted on said shaft, control means including said switch means mounted on the side of said bracket remote from said centrifugally influenced means, a longitudinally movable needle extending through said thrust thrust button and a portion of said shaft for actuating one contact of said switch means in response to operation of said centrifugally influenced means, a hollow control knob rotatably supported from said bracket and forming the sole housing for said control means, and means for causing movement of the other contact of said switch means in response to rotation of said knob.

23. In a governor controlled electric motor of the type comprising a motor shaft subject to end thrust, an end bracket, a thrust button associated with one end of said shaft for transmitting said end thrust to said end bracket, centrifugally influenced means supported on said shaft on one side of said end bracket for rotation therewith, means defining a passageway through said thrust button on said shaft, a needle disposed in said passageway and movable in a direction along the axis of said shaft in response to variations in the speed of rotation of said shaft, means for connecting said needle and said centrifugally influenced means, a plurality of control means including switch contacts and electrical circuit elements disposed on the other side of said bracket and means for transmitting motion from said needle to said control means to cause said control means to perform a control function.

24. A variable speed electric motor comprising a main casing section, a motor shaft journalled in said casing section, speed control means including switch contacts mounted at one end of said casing section and extending beyond said section, a speed control knob rotatably supported from said one end of said casing section and effectively comprising an extension of said casing section, said control knob comprising the sole housing for said control means whereby upon mere removal of said speed control knob ready access to said switch contacts is provided.

25. In a governor controlled electric motor of the type comprising a motor shaft subject to end thrust, an end bracket, means for transferring said end thrust to said end bracket, centrifugally influenced means supported on said shaft on one side of said end bracket for rotation therewith including a resilient member disposed transversely of said shaft and having its center portion movable in a direction along the axis of said shaft in response to variations in the speed of rotation of said shaft, a plurality of control means including switch contacts and electrical circuit elements disposed on the other side of said bracket, and means comprising a member coaxially disposed with said shaft for transmitting motion from said member to said control means to cause said control means to perform a control function.

References Cited in the file of this patent

UNITED STATES PATENTS

| Number | Name | Date |
|---|---|---|
| 85,580 | Gilbert | Jan. 5, 1869 |
| 995,037 | Smyth | June 13, 1911 |
| 1,587,760 | Connell | June 8, 1926 |
| 2,099,050 | Chamberlain | Nov. 16, 1937 |
| 2,274,480 | Jepson | Feb. 24, 1942 |
| 2,353,314 | Lee | July 11, 1944 |
| 2,365,657 | Naul | Dec. 19, 1944 |
| 2,394,283 | Yost | Feb. 5, 1946 |
| 2,416,973 | Wright | Mar. 4, 1947 |
| 2,454,371 | Berges | Nov. 23, 1948 |
| 2,493,140 | Heath | Jan. 3, 1950 |
| 2,493,897 | Petz et al. | Jan. 10, 1950 |